United States Patent
Mueck et al.

(10) Patent No.: US 9,462,478 B2
(45) Date of Patent: Oct. 4, 2016

(54) DYNAMIC SHARED ACCESS SPECTRUM SELECTION

(71) Applicant: Intel Corporation, Santa Clara, CA (US)

(72) Inventors: Markus Dominik Mueck, Neubiberg (DE); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 14/229,742

(22) Filed: Mar. 28, 2014

(65) Prior Publication Data
US 2015/0281971 A1    Oct. 1, 2015

(51) Int. Cl.
| | |
|---|---|
| H04W 16/14 | (2009.01) |
| H04W 28/16 | (2009.01) |
| H04W 16/06 | (2009.01) |
| H04W 16/10 | (2009.01) |

(52) U.S. Cl.
CPC .......... *H04W 16/14* (2013.01); *H04W 16/06* (2013.01); *H04W 16/10* (2013.01); *H04W 28/16* (2013.01)

(58) Field of Classification Search
CPC ... H04W 16/14; H04W 16/10; H04W 16/06; H04W 28/16
See application file for complete search history.

(56) References Cited

U.S. PATENT DOCUMENTS

| | | | | |
|---|---|---|---|---|
| 2008/0222019 A1* | 9/2008 | Stanforth | ............. | G06Q 10/063 705/37 |
| 2009/0131014 A1* | 5/2009 | Mashinsky | ........... | H04W 16/10 455/405 |
| 2012/0264396 A1 | 10/2012 | Smith et al. | | |
| 2013/0273958 A1 | 10/2013 | Srikanteswara et al. | | |
| 2014/0357218 A1* | 12/2014 | Andrianov | ............. | H04W 4/24 455/406 |
| 2015/0103685 A1* | 4/2015 | Butchko | ............. | H04L 43/0894 370/252 |

FOREIGN PATENT DOCUMENTS

| | | |
|---|---|---|
| KR | 1020120060534 A | 6/2012 |
| WO | WO-2015148377 A1 | 10/2015 |

OTHER PUBLICATIONS

"International Application Serial No. PCT/US2015/022009, International Search Report mailed Jul. 29, 2015", 4 pgs.

(Continued)

*Primary Examiner* — Barry Taylor
(74) *Attorney, Agent, or Firm* — Schwegman Lundberg & Woessner, P.A.

(57) ABSTRACT

Embodiments of a system and method for Dynamic Shared Access Spectrum Selection in a cellular network are generally described herein. A dynamic framework for fully realizing benefits of proposed dynamic frequency sharing systems, capable of operating across the full continuum of frequency sharing scenarios, such that any reasonable amount of spectrum that is available for any feasible duration may be allocated for dynamic sharing with cellular network operators is disclosed. A Dynamic Shared Access Spectrum Selection control in a cellular network comprises a processor configured to communicate spectrum needs to a Spectrum Decision Making Entity, receive, from the Spectrum Decision Making Entity, an identified most advantageous secondary spectrum opportunity, and accept the identified secondary spectrum opportunity from a Spectrum Broker communicatively coupled to the Spectrum Decision Making Entity.

22 Claims, 6 Drawing Sheets

(56) References Cited

OTHER PUBLICATIONS

"International Application Serial No. PCT/US2015/022009, Written Opinion mailed Jul. 29, 2015", 6 pgs.

Buddhikot, Milind M, et al., "DIMSUMNet: New Directions in Wireless Networking Using Coordinated Dynamic Spectrum Access", World of Wireless Mobile and Multimedia Networks 2005, Sixth IEEE International Symposium, (Jun. 13-16, 2005), 78-85.

* cited by examiner

DYNAMIC SHARED ACCESS SPECTRUM SELECTION

TECHNICAL FIELD

Examples generally relate to frequency allocation in a cellular network. One or more examples relate to spectrum selection from underutilized sources for cellular network allocation.

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Cellular networks, such as LTE, can allow a device to connect to or communicate with other devices. Modern LTE networks can include both large and small cells configured in a Heterogeneous Network (HetNet) configuration. The base stations (e.g., Enhanced Node Bs (eNodeBs)) of large and small cells can be configured to operate on different frequency bands. Frequency bands, i.e. spectrum, adequate for the various types of communication content must be available to a base station for a device to connect to, or communicate with, other devices.

Traditionally, additional frequencies can only be allocated to network operators when needed through Licensed Shared Access (LSA) of already licensed dedicated spectrums by their owners. While on one hand there is a severe licensed dedicated spectrum scarcity for mobile operators, spectrum utilization measurements worldwide show that the available unlicensed spectrum is greatly underutilized, particularly in frequency bands suitable for mobile services. Dynamic sharing of unlicensed spectrum such as white spaces and Ultra Wide Band (UWB) typically used for Wi-Fi is a new option in the range of solutions for increasing available spectrum to mobile operators. A key factor underlying this trend is the existence of substantial amounts of underutilized spectrum which cannot be easily repurposed for traditional exclusive licensing by operators. Thus, in order to realize the full benefit of proposed dynamic frequency sharing systems, there is now a need for a dynamic framework capable of operating across the full continuum of frequency sharing scenarios such that any reasonable amount of spectrum that is available for any feasible duration can be allocated for dynamic sharing with cellular network operators.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
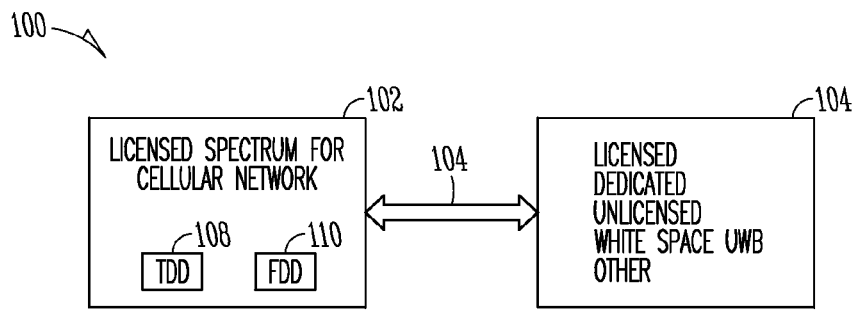
FIG. 1 shows an example of a high level block diagram for dynamic frequency sharing in a cellular network.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refers to a wireless communication device such as a cellular telephone, smartphone, tablet, netbook, wireless terminal, laptop computer, a femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a user equipment (UE), a wireless communication device or some other similar terminology known in the art.

Numerous organizations have forecast huge mobile broadband traffic growth over the coming 5-10 years worldwide. On average, those forecasts approach 80% compound annual growth rate. This high traffic growth indicates that frequency spectrum (current and planned) targeted for exclusive licensing by mobile broadband carriers could be exhausted before the end of the decade.

Various technologies are being considered to increase the capacity of mobile carriers' spectrum in order to delay that spectrum exhaustion point. These include Wi-Fi offloading, content optimization, and reduced cell size, among others. Even when traffic growth projections are adjusted for the benefits provided by these technologies and the expected increase in licensed spectrum, the supply side still forecasts inadequacy, and will likely not satisfy the increased demand for bandwidth by decade's end.

However, spectrum utilization measurements in several countries around the world have shown that there could be underutilization of spectrum in the frequency range suitable for mobile applications. Systems licensed to operate in these bands, and their needs, cannot be ignored as these systems often represent essential applications such as public safety or other government applications.

Industry and regulatory agencies are have recently made efforts to adopt more flexible and dynamic regulatory framework on spectrum sharing or access, often referred to as Dynamic Spectrum Sharing (DSS) and Dynamic Spectrum Access (DSA), through which a secondary user could access the spectrum licensed to a primary user without creating any harmful interference. The Federal Communications Commission (FCC) television whitespace (TVWS) ruling in the United States (US) is one of the early examples of DSA. However, it is aimed at license-exempt devices and therefore less suitable for cellular operation. There is also benefit to a regulatory regime and a solution that would allow mobile operators to operate in non-cellular bands with consent from the primary services that use the band, for a given period of time, and without causing harmful interference to any party.

Cloud Spectrum Services (CSS), is a cloud-based spectrum sharing scheme that improves utilization of frequency spectrum. CSS is a means for mobile operators to gain temporary, coordinated access to other licensed spectrum that might be made available for cellular use by its licensee, or Primary Spectrum Holder (PSH), in exchange for economic benefit. LSA (Licensed Shared Access) and ASA (Authorized Shared Access) are proposed concepts for introducing shared spectrum based solutions to allow mobile cellular operators access to additional licensed spectrum from other licensees normally not available to them (such as public safety, govt. etc.). Unfortunately, ASA is limited to International Mobile Telecommunications (IMT) spectrum. LSA addresses a portion of non-IMT bands but does not provide dynamic negotiation for additional spectrum of all bands. Neither concept supports dynamic sharing across uncoordinated frequency bands.

An implementation of Cloud Spectrum Services (CSS), which supports dynamic opportunistic allocation of coordinated and uncoordinated bands of licensed dedicated, unlicensed, white space and UWB frequencies, is disclosed in FIGS. 1-6.

FIG. 1 shows an example of a high level block diagram for dynamic opportunistic frequency sharing in a cellular network. FIG. 1 depicts an example of a system 100 that comprises a legacy band 102 receiving spectrum from or returning spectrum to, at arrow 104, additional uncoordinated licensed dedicated, unlicensed, white space and/or UWB spectrum band 106. The legacy band 102 may include a Time Division Duplexing (TDD) band 108 or a Frequency Division Duplexing (FDD) band 110. The additional spectrum from the additional spectrum band 106 may comprise but is not limited to IMT, legacy licensed, cellular, or coordinated bands.

Figure 2A:
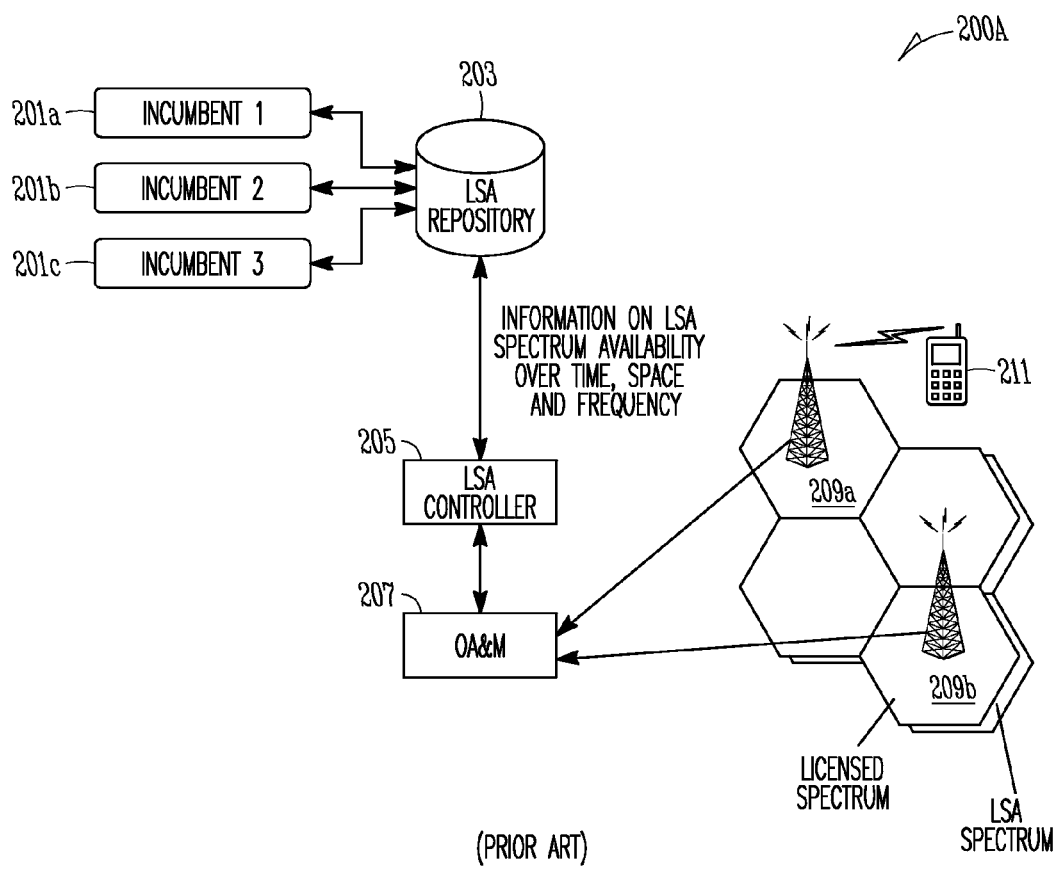
FIG. 2A shows a high level diagram illustrating an exemplary traditional Licensed Shared Access (LSA) system.

FIG. 2A shows a high level diagram illustrating an exemplary traditional Licensed Shared Access (LSA) system 200A. In a contemporary LSA system, Incumbents 201 *a-c* are original spectrum owners. For Example, Incumbents 201 *a-c* may own ENG spectrum from 2.3-2.4 GHz in some European countries. LSA Repository 203 is a data base containing information on spectrum availability of shorter term aspects of spectrum sharing without access to IMT and other bands. The LSA Repository 203 is communicatively coupled to LSA controller 205, which performs information management and translates LSA Repository 203 data base contents into spectrum access conditions for LSA licensees, while Operator Administration and Management (OA&M) 207 provides operations, administration, and management for the network operator's network. OA&M manages limited short term additional spectrum for the network operator's base stations 209*a-b* serving mobile user 211.

Figure 2B:
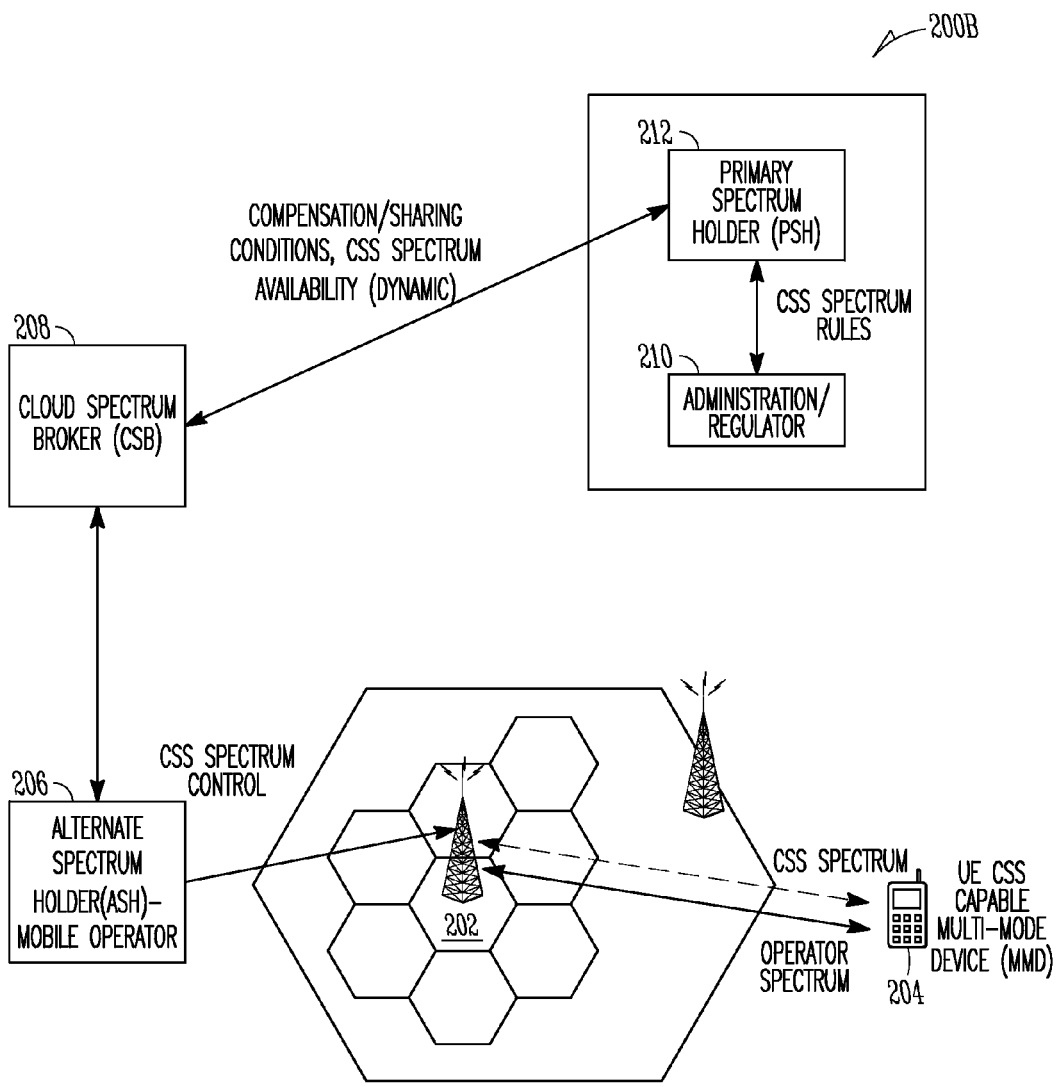
FIG. 2B shows an example of a high level diagram illustrating novel Cloud Spectrum Services (CSS) access to additional frequency spectrum in a cellular network system.

FIG. 2B shows an example of a high level diagram illustrating Cloud Spectrum Services 200B for accessing additional frequency spectrum in a cellular network system using by supporting Dynamic Shared Access Spectrum Selection. LSA and ASA concepts have recently been developed by Radio Spectrum Policy Group (RSPG) for answering network operators' needs for more spectrum, as it is expected that no more dedicated spectrum will be available for cellular operators for mobile communications in the future. LSA and ASA thus propose partial mechanisms for introducing limited shared spectrum based solutions, so that mobile cellular operators will have access to some additional licensed spectrum from other licensees (like public safety, govt. etc.) normally unavailable to them. ASA, however, is limited to IMT spectrum, while LSA also addresses only a subset of non-IMT bands. Neither proposal has a detailed implementation solution.

CSS addresses a similar structural framework as LSA and ASA, but provides detailed implementation solutions not limited to IMT bands. CSS provides access to both dedicated licensed spectrum and unlicensed spectrum wherein dedicated licensed spectrum is a long-term license acquired by a stakeholder (which is either granted to them or bought in an auction for typically more than 20 years), which guarantees exclusive spectrum usage rights for a given band, in a given geographic area. Examples include cellular mobile phone bands (GSM, UMTS, and LTE), etc. and unlicensed spectrum is unlicensed bands openly accessible by all systems that are certified for the operation in the concerned bands. Examples include industrial, scientific and medical (ISM) radio bands in which are used by Cordless phones, Bluetooth devices, near field communication (NFC) devices, and wireless computer networks. CSS also provides access to coordinated and uncoordinated white space and UWB frequencies. Spectrum may be allocated based on various timescales, ranging from static to a highly dynamic allocation of shared spectrum.

In other words. CSS is a dynamic spectrum sharing scheme for addressing the current and future spectrum scarcity problem. It enables Dynamic Spectrum Sharing/Dynamic Shard Access (DSS/DSA) with a robust and flexible range of dynamism, including real-time trading of spectrum resources. Other methods with inherently less flexible dynamism may require an overhaul shortly after they are deployed, once their coarse level of dynamism reaches its optimization capacity.

CSS is a mutually beneficial framework for Primary Shareholders (PSHs) to lease spectrum to mobile operators. CSS enables the PSH to monetize spectral resources that are not being fully used but without giving up rights to the spectrum. It ensures non-interfering operation and that spectrum may be recalled when the PSH needs it. It also provides the Alternative Spectrum Holder (ASH), i.e. the mobile operator, exclusive use of additional spectral resources per agreed-upon terms and conditions. Mutual benefit is crucial to the success of any shared spectrum access scheme. CSS provides supplemental licensed spectrum to mobile operators for the duration of the transaction allowing for Quality of Service (QoS) guarantees not possible with Wi-Fi offload or with unlicensed spectrum in general. The duration of the lease, spectrum bandwidths, the geographic limitations, and other parameters are agreed upon by PSH and the operator (ASH) as part of the transaction.

The mobile devices that ultimately use this leased spectrum are connected devices, giving the PSH a means for controlling/monitoring spectrum transactions if so they choose and alleviate concerns regarding interference and guarantees of spectrum emergency availability. While spectrum sharing techniques have been discussed for decades, their implementation has met with practical limitations. CSS finally creates a framework that provides mutual benefit for both the mobile operators as well as the PSH, thus making spectrum sharing a practical reality.

CSS includes a flexible dynamic framework with the use of a Cloud Spectrum Broker (CSB), which manages any mix of sharing transactions. Furthermore, the CSB also allows mobile operators (ASH) to access spectrum from multiple sources and provides PSH multiple options to lease spectrum, thereby maximizing spectrum use and efficiency compared to more static sharing schemes limited to coarse granularity transactions. Similar to cellular roaming, which enables functionality for seamless geographical utilization across multiple bands and operators, CSS orchestrates temporary utilization at User Equipment (UE) and base stations upon finalization of the transaction. Whereas a cellular roaming band-transition occurs typically due to change in geographic location, CSS operates based on changing bandwidth needs of the UEs optimized against real-time availability of resources (roaming would be supported as well). Since CSS is a cloud-based approach, any of the components connected to it—the client device, the base station, or operator's network, could potentially initiate a CSS transaction, based on a variety of criteria.

CSS components comprise a Primary Spectrum Holder (PSH) 212 having an exclusive right to use the spectrum, an Alternate Spectrum Holder (ASH) 206, i.e. mobile operator, that leases spectral resources from PSH 212, an Administration/Regulatory agency 210 to authorize a transaction between a PSH 212 and an ASH 206, and a Cloud Spectrum broker (CSB) 208 to manage CSS transactions for a BS 202 to use in providing user equipment (UE) 204 with service. ASH 206 infrastructure, i.e. Radio Access Network (RAN) and core network, must have the capability to use the leased spectrum. The UE 204 may be a CSS-capable multi-mode device.

Three key logical interfaces are defined between a PSH 212 and a CSB 208, between an ASH 206 and a CSB 208, and between an ASH 206 and a UE 204. In various CSS architecture embodiments, there may also be another logical interface defined between a CSB 208 and the UE 204. A PSH 212 could provide its spectrum resource availability to the CSB 208 dynamically. This resource information may include terms and conditions such as the amount of spectrum available, the region in which it is available, the duration for which it is available and the compensation it expects. Information such as transmit power levels and Out Of Band (OOB) emissions may be decided a priori via regulations for a given band and stored in the CSB 208. The use of dynamic certification may help ensure base stations 202 and UEs 204 adhere to the regulations when operating in non-IMT bands. The ASH 206 requests spectral resources from the CSB 208, specifying details such as expected bandwidth and quality, geographical area, duration, and price it is willing to pay. The CSB 208 offers the best options to the ASH 206 after analyzing all the requirements, which the ASH 206 may choose to accept or reject. Once a transaction is successfully completed, the CSB 208 accounts for the leased spectrum and provides the PSH 212 with details that may be used to regain the spectral resource in due time. All of these transactions are performed dynamically.

Figure 3:
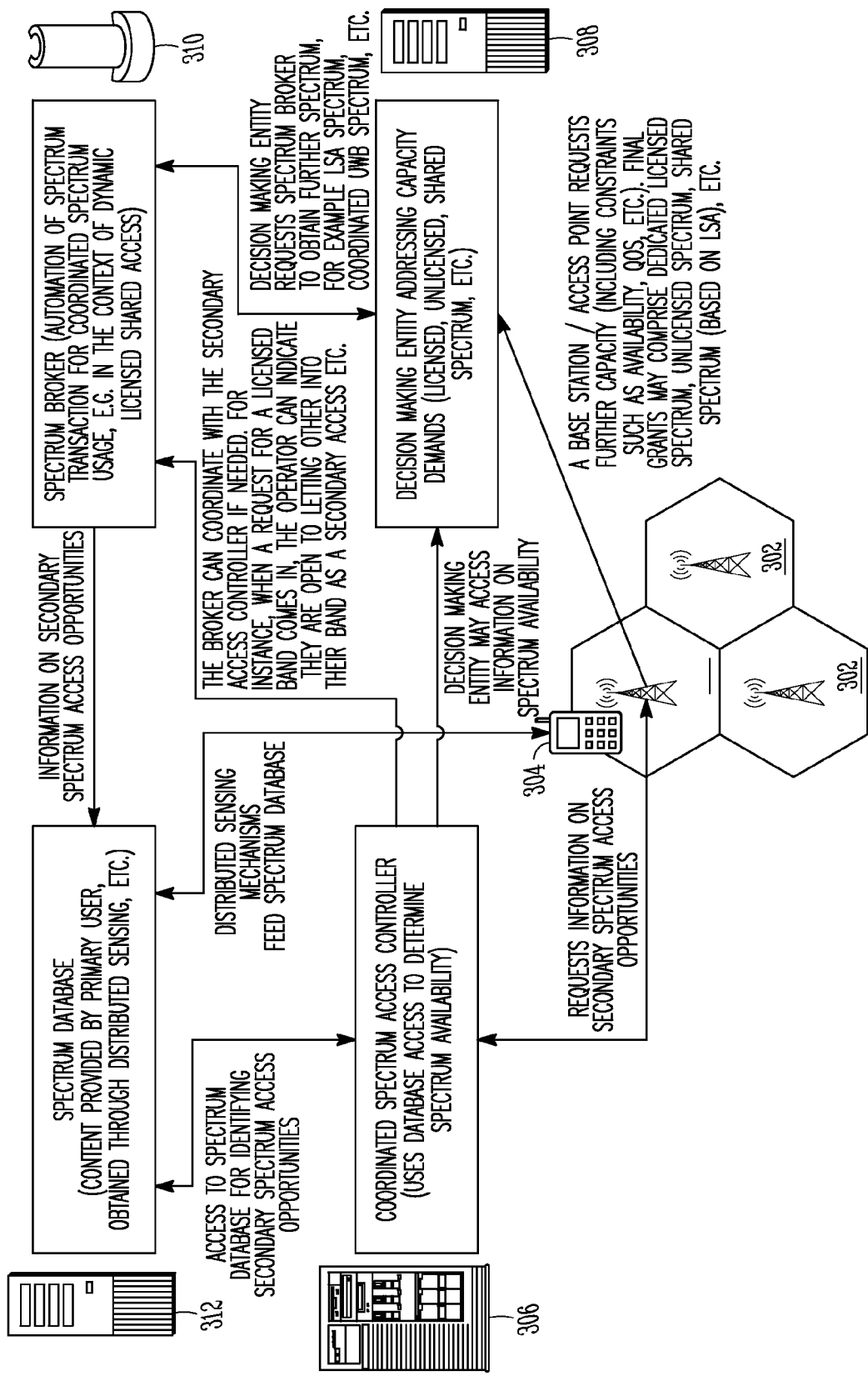
FIG. 3 shows an example of an abstract high level overview diagram illustrating Dynamic Shared Access Spectrum Selection.

FIG. 3 shows an example of an abstract high level overview diagram illustrating operation of Dynamic Shared Access Spectrum Selection, according to some embodiments. Depending on the time-dependent and geolocation-dependent spectrum needs, mechanisms and a corresponding architecture are introduced enabling simultaneous usage of diverse spectrum access/management schemes including but not limited to White Spaces (uncoordinated), White Spaces (coordinated), UWB Underlay (uncoordinated/opportunistic access), UWB Interference Alignment (uncoordinated/opportunistic access), UWB Underlay (coordinated access through central controller or similar), UWB Interference Alignment (coordinated access through central controller or similar), etc.

Simultaneous usage provides for various radio access technologies, which are possibly using distinct spectrum access/management schemes, to be used simultaneously. An example for such a simultaneous usage is for example a combination of 3GPP LTE (employing dedicated licensed spectrum for the communication) being used simultaneously with IEEE 802.11af for accessing TVWS (employing a secondary spectrum access based on spectrum availability information provided by a suitable TVWS database).

Those technologies can be used for conveying distinct data-streams (e.g., two different services are provided, one using the 3GPP link, another one using the IEEE 802.11af TVWS link) or for using a single service that distributes the data communication onto both radio access technologies. In a first example of simultaneous usage, a File Transfer Protocol (FTP) download is split over both radio access technologies. In another example of simultaneous usage, a single service may consist of two sub-streams such as an Audio and a Video stream. In the first example, the Video stream could be transported over 3GPP LTE while the Audio stream is transported over IEEE 802.11af TVWS (or vice versa). Other combinations may include 3GPP being used simultaneously with Bluetooth, 3GPP LTE being used simultaneously with Bluetooth and WiFi (IEEE 802.11a/b/g/n/ac/ad/HEW/etc.), 3GPP LIE being used simultaneously with Bluetooth and IEEE 802.11af, 3GPP LIE being used simultaneously with Bluetooth and UWB technology, 3GPP LTE being used simultaneously with WiFi (IEEE 802.11a/b/g/n/ac/ad/HEW/etc.), 3GPP LIE being used simultaneously with WiFi (IEEE 802.11a/b/g/n/ac/ad/HEW/etc.) and IEEE 802.11af TVWS, 3GPP LTE being used simultaneously with WiFi (IEEE 802.11a/b/g/n/ac/ad/HEW/etc.) and IEEE 802.11af TVWS and Bluetooth, 3GPP LIE being used simultaneously with WiMAX, 3GPP LIE being used simultaneously with WiMAX and WiFi (IEEE 802.11a/b/g/n/ac/ad/HEW/etc.), 3GPP LIE being used simultaneously with WiMAX and IEEE 802.11af TVMS, 3GPP LIE being used simultaneously with WiMAX and WiFi (IEEE 802.11a/b/g/n/ac/ad/HEW/etc. and IEEE 802.11af, (IEEE 802.11a/b/g/n/ac/ad/HEW/etc) being used simultaneously with IEEE 802.11af, WiFi (IEEE 802.11a/b/g/n/ac/ad/HEW/etc.) being used simultaneously with Bluetooth, WiFi (IEEE 802.11a/b/g/n/ac/ad/HEW/etc) being used simultaneously with IEEE 802.11af and Bluetooth, 3GPP LTE being used simultaneously with 60 GHz technology (such as WiGig, for example for small cells), 3GPP LIE being used simultaneously with 60 GHz technology (such as WiGig, for example for small cells) and WiFi (IEEE 802.11a/b/g/n/ac/ad/HEW/etc.), 3GPP LIE being used simultaneously with 60 GHz technology such as WiGig, for example for small cells) and IEEE 802.11af TVWS, 3GPP LIE being used simultaneously with 60 GHz technology (such as WiGig, for example for small cells) and WiFi (IEEE 802.11a/b/g/n/ac/ad/HEW/etc.) and IEEE 802.11af TVWS, 3GPP LIE being used simultaneously with 60 GHz technology (such as WiGig, for example for small cells) and WiFi (IEEE 802.11a/b/g/n/ac/ad/HEW/ etc.) and Bluetooth, IEEE 802.11af TVWS being used simultaneously with 60 GHz technology (such as WiGig, for example for small cells), (IEEE 802.11a/b/g/n/ac/ad/HEW/ etc.) being used simultaneously with 60 GHz technology (such as WiGig, for example for small cells), etc.

Because classical spectrum assignment strategies are insufficient for addressing future spectrum needs, innovative spectrum usage strategies are currently under development from political (European Commission, National Regulation Administrations, U.S. FCC, CEPT, etc.) and technical (Standardization Organizations such as ETSI and IEEE, Infrastructure and Device Manufacturers, etc.) perspectives to open access to unused spectrum. In some embodiments, White Spaces, where a Secondary User is able to access a Primary User's spectrum when the spectrum is unused during a given time period over a given geographic area may be accessed. For example, the US has introduced precise sharing rules and corresponding standards (IEEE 802.11af, IEEE 802.22) for access to television (TV) Broadcasting spectrum, which is expected to be deployed in the near future. Typically, White Spaces access is performed using an uncoordinated (opportunistic) access scheme.

In other embodiments, Licensed Shared Access spectrum is accessed in a similar manner to White Space access, where a Secondary User is able to access a Primary User's spectrum when the spectrum is unused during a given time period over a given geographic area. While White Spaces access can probably only meet a low level of guaranteed Quality of Service (QoS), Licensed Shared Access is expected to provide an improved signal quality. In particular, the Primary User is expected to provide a long-term (multi-months/year) usage guarantee to the Secondary User for a given geographic area. Due to the inherent QoS guarantees, this solution is expected to be particularly appealing to Cellular Operators. there will typically only be one single LSA licensee for a given band at a given time and location, i.e. There is no competition between LSA licensees to access a given LSA band. Access quality will indeed be pre-defined for a given LSA in a given LSA band, a given geographic area and a given time.

The above new innovative spectrum usage paradigms are expected to address some of the spectrum requirements which are outlined in the U.S National Broadband Plan. However, even further new approaches are expected to be required in order to fully meet the 500 MHz Mobile Broadband Spectrum requirement by the year 2020. The White Spaces and Licensed Shared Access approaches are thus expected to be implemented in the immediate future, but further candidate technologies must be subsequently identified. Other CSS supported future candidate spectrum access technologies may comprise UWB variations.

Using Ultra Wideband Underlay Communication, a broadband Mobile Device transmits at ultra-low power density levels (such that the Primary spectrum users are not interfered) over a large bandwidth. This approach allows for a "parallel" usage of target bands by a several users. However, due to the large bandwidth requirements, the additional capacity provided by this approach is expected to be limited. Ultra Wideband Interference Alignment (IA) has recently become popular not only to manage the interference well, but also to optimally exploit the possible capacity gain caused by multiple pairs of transmitters and receivers. Theoretically, IA scales the channel capacity by K/2, where K is the number of user pairs. This fact makes IA highly attractive for future communication systems with numerous pairs of users. CSS may support UWB in conjunction with an uncoordinated (opportunistic) or coordinated (similar to Licensed Shared Access, for example) spectrum access approach.

In these contexts, a Base Station 302 (or any other suitable Infrastructure element) would request additional spectrum from a "Spectrum Decision Making" 308 entity that decides on the most suitable candidate technologies by taking parameters into account such as availability (to be identified by interacting with a Controller 306 or Broker 310), Cost, Level of Guaranteed QoS, Efficiency and Amount of available Spectrum for Mobile Broadband.

The spectrum access alternatives are that may be used by the Spectrum Decision Making Entity 308 are detailed in Table 1 wherein The symbols "---", "--", "-", "+/-", "+", "++", "+++" indicate the quality/amount of the concerned Key Performance Indicator (KPI) in increasing order. Table 1 shows Key Characteristics of Spectrum Access Approaches.

TABLE 1

| Spectrum Access Approach | Cost | Guaranteed QoS | Efficiency | Amount of Spectrum available for Mobile Broadband |
|---|---|---|---|---|
| Licensed Dedicated Spectrum | +++ | +++ | +++ | – |
| Unlicensed Spectrum | --- | -- | + | +/– |
| White Spaces (uncoordinated) | -- | -- | + | + |
| White Spaces (coordinated) | – | + | + | + |
| Licensed Shared Access | + | ++ | ++ | + |
| UWB Underlay (uncoordinated/opportunistic access) | --- | – | -- | +++ |
| UWB Interference Alignment (uncoordinated/opportunistic access) | -- | – | + | +++ |
| UWB Underlay (coordinated access through central controller or similar) | – | ++ | – | +++ |
| UWB Interference Alignment (coordinated access through central controller or similar) | – | ++ | + | +++ |

The symbols "---", "--", "-", "+/-", "+", "++", "+++" indicate the quality/amount of the concerned KPI in increasing order.
The overall system architecture is illustrated in the sequel:

The Spectrum Database 312 contains information on the current (and future) availability of Spectrum as it has been acquired through the Spectrum Broker 310 entity. Depending on the applicable access mechanisms (licensed, unlicensed/opportunistic, licensed shared, underlay, etc.), the current occupancy may be identified through interactions with the suitable Incumbents (Incumbents inform the Database 312 on Spectrum usage plans in time, frequency and location) and/or sensing may be required to be applied (on top of interactions with Incumbents). Sensing is typically performed through distributed sensing mechanisms, i.e. the concerned Mobile Devices 304 are requested to perform very small sensing tasks and the corresponding results are aggregated in the Database, minimizing overhead in the concerned Mobile Devices. The spectrum database 312 contains Radio Environment Map information, which provides an overall picture on the radio parameters (QoS, QoE, etc.) for a given access technology, a given frequency band, a given geographic area and a given time period.

A Coordinated Spectrum Access Controller 306 manages access to the Spectrum Database 312. It may also manage secondary access to spectrum (licensed or unlicensed), for example, UWB Underlay (coordinated access through central controller or similar) and UWB Interference Alignment (coordinated access through central controller or similar).

A Spectrum Decision Making Entity 308 is contacted by Network Infrastructure (such as Base Stations are other suitable entities) if a lack of Spectrum occurs. The Spectrum Decision Making Entity 308 receives requests for a given amount of Spectrum and possible further criteria are communicated (such as duration of availability, sharing conditions, level of guaranteed QoS, etc.). If there is spectrum available that is currently not used (the information may be typically obtained from the Spectrum Broker 310) by the concerned cellular system (for example due to complex handling of UWB Interference Alignment or similar), the Spectrum Decision Making Entity 308 may decide to release such available, but currently unused spectrum for cellular usage. If the decision is to release such new spectrum, the Spectrum Decision Making Entity 308 may grant access to the Network Infrastructure and instruct the Spectrum Broker to 310 provide corresponding information to the Spectrum Database 312.

The Spectrum Decision Making Entity 308 interacts with the Spectrum Broker 310 in order to request the acquisition of additional spectrum, preferably in accordance with the characteristics requested by the Network Infrastructure. Such new spectrum may be, for example, LSA spectrum, licensed spectrum leased from another operator, etc. Once the spectrum is acquired, it may be made available to the Network Infrastructure and the Spectrum Database 312 is correspondingly informed. The Spectrum Decision Making Entity 308 may restrict the usage of certain bands or restrict certain spectrum usage strategies. For example, when the licensed bands go from a saturation state to an average usage state, the more complex spectrum usage approaches (such as UWB Interference Alignment or similar) may be excluded from further usage but may be exploited again in an event that the licensed bands go to a saturation state in the future.

The Spectrum Decision Making Entity 308 may also decide to lease spectrum available to the concerned operator (such as LSA spectrum, etc.) to other cellular operators. For example, during a period of low usage of LSA spectrum, parts of the LSA spectrum may be offered to other operators who may for example not have obtained LSA spectrum in the concerned area and during the concerned time period. The Spectrum Decision Making Entity 308 may make a decision to lease LSA spectrum (or similar) to other operators and it also decides on the manner in which, the LSA (or similar) spectrum is reclaimed in case of need. The actual negotiation with other operators on spectrum leasing is performed through the Spectrum Broker 310.

One skilled in the art would recognize that depending on the required functionalities, the above mentioned entities 306-312 may be implemented with a reduced set of features, some entities 306-312 may be only partially implemented or some entities 306-312 may be eliminated or combined with other entities. Some interactions between entities 306-312 may be reduced or not implemented.

Implementation of the Spectrum Decision Making Entity 308 may preferably be based on a cost-function optimization. As defined in Table 1, there are a number of Key Performance Indicators (KPIs) such as Cost, Guaranteed QoS, Efficiency, Amount of Spectrum available for Mobile, and others. Table 2 ranks these KPIs from "---" (very poor) to "+++" (very good). For a numerical optimization, numerical values for each of the KPIs may be introduced. Table 2 shows exemplary Numeral Value for KPIs of Spectrum Access Approaches.

TABLE 2

| Spectrum Access Approach | Cost $C_{Cost}$ | Guaranteed QoS $C_{QoS}$ | Efficiency $C_{Efficiency}$ | Amount of Spectrum available for Mobile Broadband $C_{SpectrumAvailable}$ |
| --- | --- | --- | --- | --- |
| Licensed Dedicated Spectrum | +++ ($C_{Cost}$ = +6) | +++ ($C_{QoS}$ = +6) | +++ ($C_{Efficiency}$ = +6) | – ($C_{SpectrumAvailable}$ = +2) |
| Unlicensed Spectrum | --- ($C_{Cost}$ = 0) | -- ($C_{QoS}$ = +1) | + ($C_{Efficiency}$ = +4) | +/– ($C_{SpectrumAvailable}$ = +3) |
| Etc. | Etc. | Etc. | Etc. | Etc. |

In an exemplary embodiment, corresponding KPI values are defined for the other Spectrum Access Approaches introduced in Table 1. Table 2 defines rules:
"---"=Cost factor "0",
"--"=Cost factor "1"
"-"=Cost factor "2"
"+/-"=Cost factor "3"
"+"=Cost factor "4"
"++"=Cost factor "5"
"+++"=Cost factor "6"

Alternative embodiments may employ other suitable value distributions. For example, by using Cost factor values with larger differences in scale lead to a higher priority for good KPIs. For example, "---" may still lead to a cost factor value "0", "--" may lead to a cost factor value "2", "-" may lead to a cost factor value "4", etc. In this embodiment, a high quality KPI leads to a high weighting of the concerned Spectrum Access Approach. For all (or selected) Spectrum Access Approaches, a corresponding total cost function is calculated by using two types of weighting factors. $W_x$ may represent a weighting factor depending on the amount of spectrum still available for new users. A value of "0" or slightly above "0" corresponds thus to saturation.

A high value indicates that the corresponding Spectrum Access Approach may be exploited for assigning further spectrum to new users. $A_x$ may represent a weighting factor for the needs of the applications to be conveyed on the corresponding band and using the corresponding access technology. Some applications, for example, may require ultra-reliable connections such that licensed spectrum may be the preferred choice. This leads to a high value of the corresponding weighting factor for licensed spectrum, while less reliable access mechanisms (such as uncoordinated UWB, etc.) will lead to a weighting factor close to zero. Alternatively, this weighting factor may be included into other weighting factors, such as $W_x$, instead of using a separate variable. Some examples for application needs and corresponding values for weighting factor $A_x$ are indicated in Tab.3. Where one of the application requirements (as given in the below-mentioned table) is predominant, this value is used for "$A_x$". Where an application has a multitude of requirements, a combination of the corresponding weighting factors "$A_x$" may be applied. In some embodiments, the result of a multiplication (or summation) of all relevant weighting factors for a given Spectrum Approach as the final value for "$A_x$".

Based on Table 2, a combination of Application needs may be achieved by a multiplication or summation of the corresponding weighting factors. For example, in an embodiment where an application requires "Guaranteed throughput" as well as "Low subscription cost", the total weighting factor may be derived by multiplication as $A_{tot,\ Licensed}=(+6)*(+1)=+6$, $A_{tot,\ UWB\_uncoordinated}=(+2)*(+6)=+12$, etc. or by summation as $A_{tot,\ Licensed}=(+6)+(+1)=+7$, $A_{tot,\ UWB\_uncoordinated}=(+2)+(+6)=+8$ etc. where $Z_x$ represents a weighting factor for each of the KPIs, indicating the importance of the concerned KPIs. A value of "0" or slightly above "0" may correspond to a small level of importance, while a high value indicates a high importance of the concerned KPI. For the embodiments exemplified in Table 2, the final cost functions to be optimized would be:

$$C_{tot\_Licensed} = W_{tot\_Licensed} * A_{tot\_Licensed} * \\ (Z_{Cost,Licensed} * C_{Cost,Licensed} + Z_{QoS,Licensed} * \\ C_{QoS,Licensed} + Z_{Efficiency,Licensed} * \\ C_{Efficiency,Licensed} + Z_{SpectrumAvailable,Licensed} * \\ C_{SpectrumAvailable,Licensed})$$

$$C_{UnLicensed} = W_{UnLicensed} * A_{tot\_UnLicensed} * \\ (Z_{Cost,UnLicensed} * C_{Cost\ UnLicensed} + Z_{QoS\ UnLicensed} * \\ C_{QoS\ UnLicensed} + Z_{Efficiency\ UnLicensed} * \\ C_{Efficiency\ UnLicensed} + Z_{SpectrumAvailable\ UnLicensed} * \\ C_{SpectrumAvailable\ UnLicensed})$$

Finally, the Spectrum Access Approach is chosen, which leads to the highest Cost Function Value. Table 3 illustrates Application needs and corresponding numerical examples for weighting factor "$A_x$".

Figure 4:
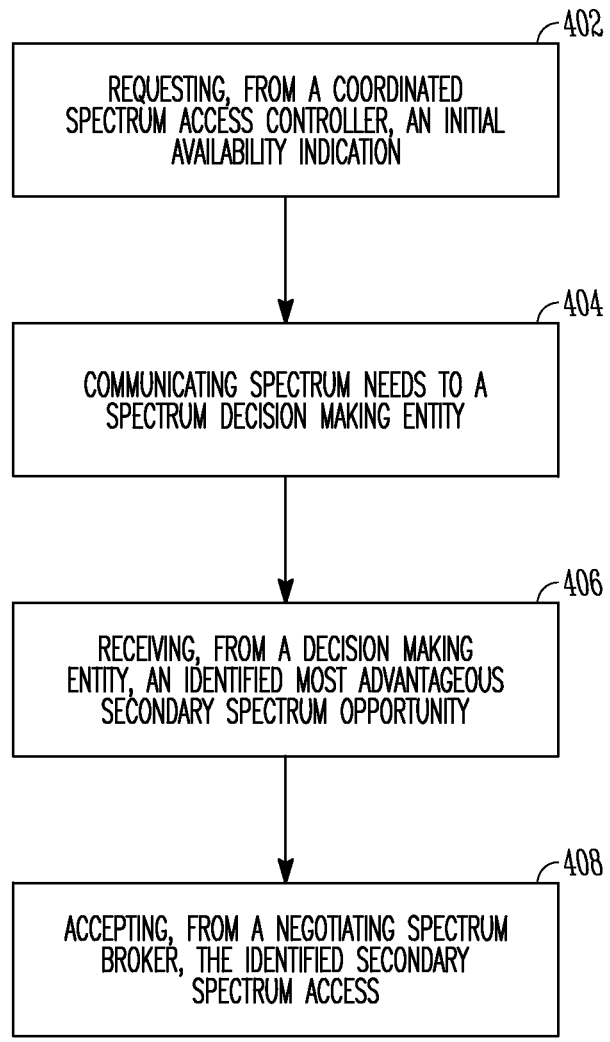
FIG. 4 a high level overview flow chart illustrating Dynamic Shared Access Spectrum Selection, according to some example embodiments.

FIG. 4 is a high level overview flow chart illustrating Dynamic Shared Access Spectrum Selection, according to some example embodiments. In operation 402, a base station or network operator 302 may request an initial spectrum availability indication from a Coordinated Spectrum Access Controller 306. Control proceeds to operation 404.

In operation 404, assuming any indicated availability, actual spectrum needs are communicated to a Spectrum Decision Making Entity 308 by a base station or network operator 302. The Spectrum Decision Making Entity 308 makes a best match identification between the communicated spectrum needs and available spectrum according to information contained in a Spectrum Database 312. Control proceeds to operation 406.

In operation 406, the base station or network operator 302 receives an offer from the Spectrum Decision Making Entity of the most advantageous secondary spectrum opportunity available, identified in operation 404. Control proceeds to operation 408.

In operation 408, the base station or network operator 302 accepts the most advantageously identified available secondary spectrum from a negotiating Spectrum Broker 310.

Additional secondary spectrum is thus acquired in the manner of operations 404-408 by the currently disclosed architecture based on a central LSA controller and database for a large area and serving multiple operators as well as multiple diverse incumbents, that coordinates secondary access to spectrum with licensed shared access wherein military, satellite services and public safety may all share one common database framework.

Figure 5:
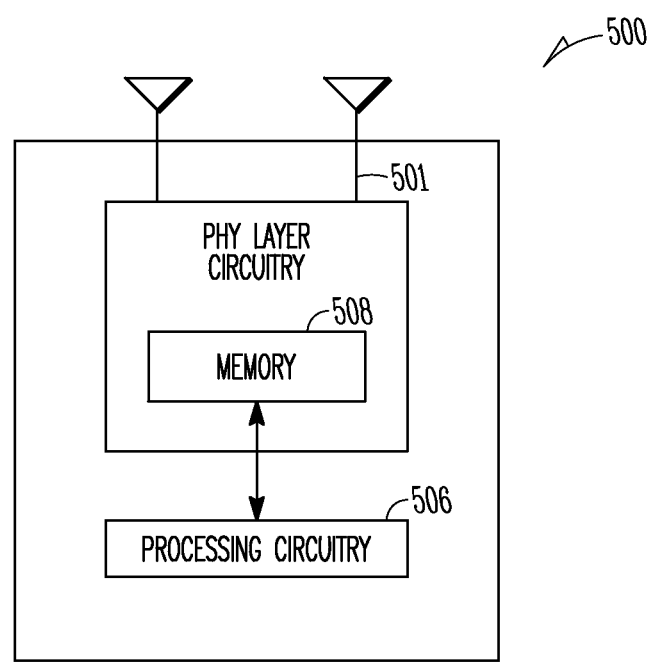
FIG. 5 shows a functional diagram of an exemplary communication station in accordance with some embodiments.

FIG. 5 shows a functional diagram of an exemplary communication station in accordance with some embodiments. In one embodiment, FIG. 5 illustrates a functional block diagram of a Base Station 302 or UE 304 (FIG. 3) in accordance with some embodiments. Communication station 500 may also be suitable for use as either a Coordinated Spectrum Access Controller 306, a Spectrum Decision Mak-

TABLE 3

| Spectrum Access Approach | Application need: Support of User Mobility | Application need: Guaranteed throughput | Application need: Short Range, high data rate communication | Application need: Low subscription cost |
|---|---|---|---|---|
| Licensed Dedicated Spectrum | ++ ($A_{Licensed} = +5$) | +++ ($A_{Licensed} = +6$) | -- ($A_{Licensed} = +6$) | -- ($A_{Licensed} = +1$) |
| Unlicensed Spectrum | - ($A_{Unlicensed} = +2$) | - ($A_{Unlicensed} = +2$) | +/- ($A_{Unlicensed} = +3$) | +++ ($A_{Unlicensed} = +6$) |
| White Spaces (uncoordinated) | - ($A_{WSUncoordinated} = +2$) | - ($A_{WSUncoordinated} = +2$) | - ($A_{WSUncoordinated} = +2$) | +++ ($A_{WSUncoordinated} = +6$) |
| White Spaces (coordinated) | -/+ ($A_{WSCoordinated} = +3$) | ++ ($A_{WSCoordinated} = +5$) | - ($A_{WSCoordinated} = +2$) | +/- ($A_{WSCoordinated} = +3$) |
| Licensed Shared Access | + ($A_{LSA} = +4$) | +++ ($A_{LSA} = +6$) | +/- ($A_{LSA} = +3$) | - ($A_{LSA} = +2$) |
| UWB Underlay (uncoordinated/ opportunistic access) | -- ($A_{UWB\_uncoordinated} = +1$) | - ($A_{UWB\_uncoordinated} = +2$) | ++ ($A_{UWB\_uncoordinated} = +5$) | +++ ($A_{UWB\_uncoordinated} = +6$) |
| UWB Interference Alignment (uncoordinated/ opportunistic access) | --- ($A_{UWBIA\_uncoordinated} = 0$) | -- ($A_{UWBIA\_uncoordinated} = +1$) | ++ ($A_{UWBIA\_uncoordinated} = +5$) | +++ ($A_{UWBIA\_uncoordinated} = +6$) |
| UWB Underlay (coordinated access through central controller or similar) | -- ($A_{UWB\_coordinated} = +1$) | + ($A_{UWB\_coordinated} = +4$) | ++ ($A_{UWB\_coordinated} = +5$) | + ($A_{UWB\_coordinated} = +4$) |
| UWB Interference Alignment (coordinated access through central controller or similar) | --- ($A_{UWBIA\_coordinated} = 0$) | +/- ($A_{UWBIA\_coordinated} = +3$) | ++ ($A_{UWBIA\_coordinated} = +5$) | + ($A_{UWBIA\_coordinated} = +4$) | ing Entity 308, a Spectrum Broker 310, or a Spectrum Database 312. The communication station 500 may include physical layer circuitry 502 for transmitting and receiving signals to and from other communication stations using one or more antennas 501. The communication station 500 may also include medium access control layer (MAC) circuitry 504 for controlling access to the wireless medium. Communication Station 500 may also include processing circuitry 506 and memory 508 arranged to perform the operations described herein. In some embodiments, the physical layer circuitry 502 and the processing circuitry 504 may be configured to perform operations detailed in FIG. 4.

In accordance with some embodiments, the MAC circuitry 504 may be arranged to contend for a wireless medium configure frames or packets for communicating over the wireless medium and the PHY circuitry 502 may be arranged to transmit and receive signals. The PHY circuitry 502 may include circuitry for modulation/demodulation, upconversion/downconversion, filtering, amplification, etc. In some embodiments, the processing circuitry 504 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although communication station 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism 508 for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station STA 400 may include one or more processors and may be configured with instructions stored on a computer-readable storage device memory 508.

Figure 6:
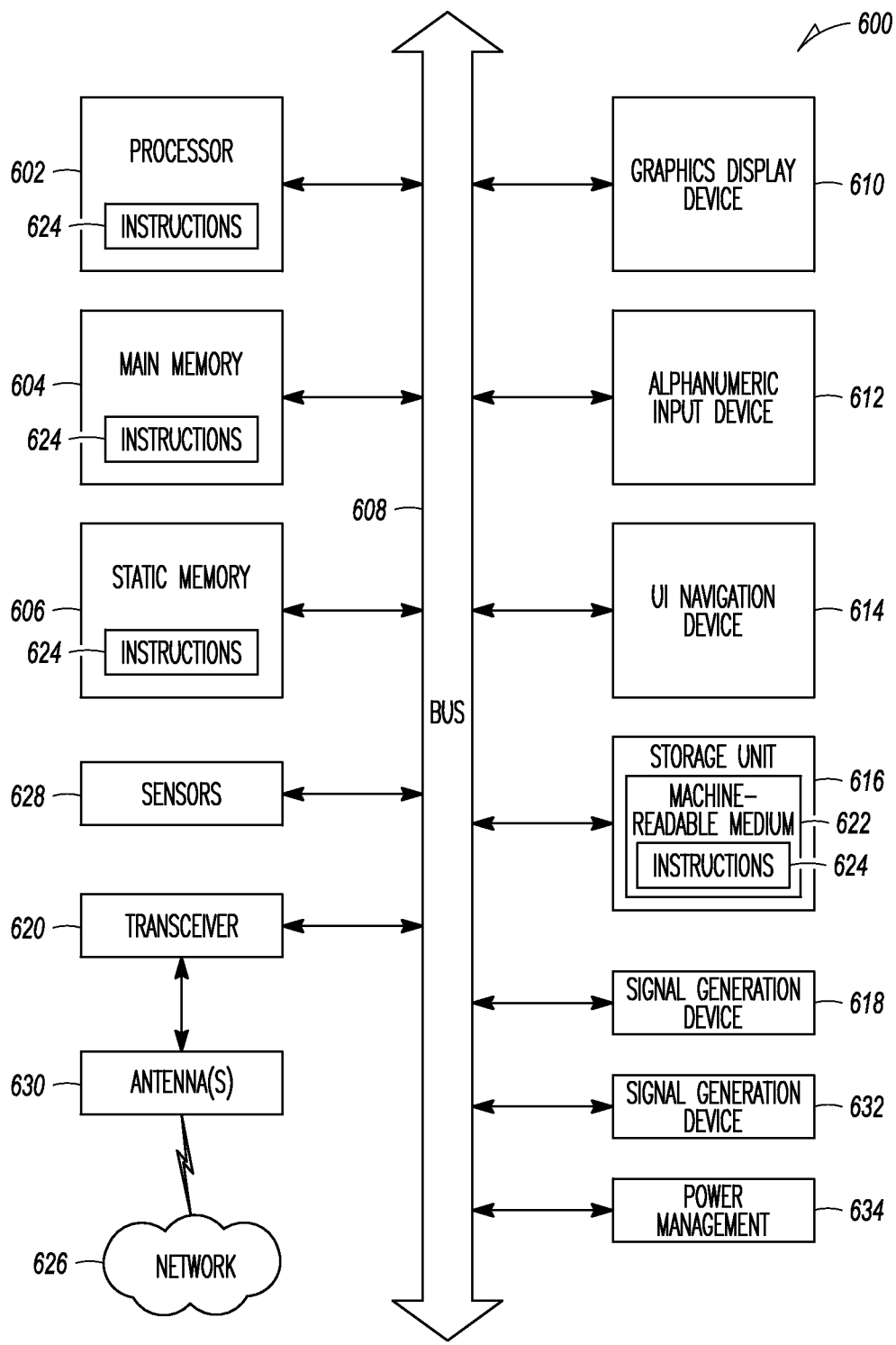
FIG. 6 shows a block diagram of an example of a machine upon which any of one or more techniques (e.g., methods) discussed herein may be performed.

FIG. 6 illustrates a block diagram of another example machine 600 upon which any one or more of the techniques (e.g., methodologies) discussed herein may performed. In alternative embodiments, the machine 600 may operate as a standalone device or may be connected (e.g., networked) to other machines. In a networked deployment, the machine 1200 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 66 (e.g., a keyboard), and a user interface (UI) navigation device 614 (e.g., a mouse). In an example, the display unit 610, input device 66 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

As used herein, a HetNet may be a cellular network system (e.g., 3GPP system) using multiple different cell types, such as macro, micro, femto, or pico cells. Some or all of the applied cell types may or may not be (partially or fully) overlapping in time, space, or frequency. A HetNet may also be a cellular network combined with other non-cellular technology networks such as WiFi (IEEE 802.11a/b/g/n/ac/ad), WiFi for TVWS (IEEE 802.11af), mmWave systems, or the like. Some or all of the coverage areas or cells of the technologies in the HetNet may or may not be (partially or fully) overlapping in time, space, or frequency.

Wired communications may include serial and parallel wired mediums, such as Ethernet, Universal Serial Bus (USB), Firewire, Digital Visual Interface (DVI), High-Definition Multimedia Interface (HDMI), etc. Wireless communications may include, for example, close-proximity wireless mediums (e.g., Radio Frequency (RF), such as based on the Near Field Communications (NFC) standard, InfraRed (IR), Optical Character Recognition (OCR), magnetic character sensing, or the like), short-range wireless mediums (e.g., Bluetooth, WLAN, Wi-Fi, etc.), long range wireless mediums (e.g., cellular wide area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA UMTS (Wideband Code Division Multiple Access Universal Mobile Telecommunications System), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13) and subsequent Releases (such as Rel. 14, Rel. 15, etc.), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard), electronic interaction via sound waves, IEEE 802.11a/b/g/n/ac/ad/af, WiFi, WiFi for TVWS, IEEE 802.16e/m, WiMAX, or the like.

In one embodiment, Dynamic Shared Access Spectrum Selection control in a cellular network comprises a processor(s) configured to communicate spectrum needs to a Spectrum Decision Making Entity receive, from the Spectrum Decision Making Entity, an identified most advantageous secondary spectrum opportunity, and accept the identified secondary spectrum opportunity from a Spectrum Broker communicatively coupled to the Spectrum Decision Making Entity.

In another embodiment, a method for Dynamic Shared Access Spectrum Selection in a cellular network comprises communicating spectrum needs to a Spectrum Decision Making Entity, receiving, from the Spectrum Decision Making Entity, an identified most advantageous secondary spectrum opportunity, accepting the identified secondary spectrum opportunity from a Spectrum Broker communicatively coupled to the Spectrum Decision Making Entity.

In another embodiment, a communication station comprising a transceiver configured to communicate spectrum needs to a Spectrum Decision Making Entity, receive, from the Spectrum Decision Making Entity, an identified most advantageous secondary spectrum opportunity, and accept the identified secondary spectrum opportunity from a Spectrum Broker communicatively coupled to the Spectrum Decision Making Entity.

In another embodiment, A non-transitory computer readable storage device includes instructions stored thereon, the instructions, which when executed by a machine, cause the machine to perform operations comprising communicating spectrum needs to a Spectrum Decision Making Entity, receiving, from the Spectrum Decision Making Entity, an identified most advantageous secondary spectrum opportunity; and accepting the identified secondary spectrum opportunity from a Spectrum Broker communicatively coupled to the Spectrum Decision Making Entity.

ADDITIONAL NOTES

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A Shared Access Spectrum Selection controller in a cellular network comprising a processor and physical layer circuitry in communication with the processor configured to:
   communicate spectrum needs of a plurality of user equipment to a network-implemented Spectrum Decision Making Entity;
   receive, from the Spectrum Decision Making Entity, an identified single, or simultaneous combination of, most cost performance advantageous secondary spectrum opportunity, the identified secondary spectrum opportunity comprising spectrum selected from among dedicated licensed spectrum and unlicensed spectrum, the dedicated licensed spectrum comprising cellular mobile phone bands and the unlicensed spectrum comprising industrial, scientific and medical (ISM) radio bands and coordinated and uncoordinated white space and ultra-wide band frequencies, the most cost performance advantageous secondary spectrum opportunity determined by a total cost function applied to dedicated licensed spectrum and unlicensed spectrum, the total cost function calculated by use of a first weighting factor depending on an amount of spectrum available for new users and a second weighting factor for needs of applications to be conveyed on a corresponding band and using a corresponding access technology; and
   accept the identified secondary spectrum opportunity from a network-implemented Spectrum Broker communicatively coupled to the Spectrum Decision Making Entity.

2. The Shared Access Spectrum Selection controller of claim 1, wherein the processor is further configured to request, from a Coordinated Spectrum Access Controller, an initial availability indication of any available spectrum.

3. The Shared Access Spectrum Selection controller of claim 1, wherein the processor is communicatively coupled, directly or through a Coordinated Spectrum Access Controller, to a Spectrum Database comprising information about current and/or future availability of spectrum, the Spectrum Database comprising Radio Environment Map information, which provides an overall picture on radio parameters including quality of service (QoS) and Quality of Experience (QoE) for a given access technology, a given frequency band, a given geographic area and a given time period.

4. The Shared Access Spectrum Selection controller of claim 1, wherein the most advantageous secondary spectrum opportunity is identified by a cost-function optimization.

5. The Shared Access Spectrum Selection controller of claim 1, wherein the total cost function is calculated by applying the first and second weighting factors to ranked Key Performance Indicators (KPIs) comprising Cost, Guaranteed Quality of Service (QoS), Efficiency, and Amount of Spectrum available.

6. The Shared Access Spectrum Selection controller of claim 1, wherein Spectrum is allocated based on various time-scales, ranging from static to a highly dynamic allocation of shared spectrum.

7. The Shared Access Spectrum Selection controller of claim 1, wherein the processor is further configured to transmit to the Spectrum Decision Making Entity a request for a given amount of Spectrum and further criteria comprising duration of availability, sharing conditions, and level of guaranteed quality of service (QoS).

8. A method for Shared Access Spectrum Selection in a cellular network comprising:
   communicating spectrum needs of a plurality of user equipment to a Spectrum Decision Making Entity;
   receiving, from the Spectrum Decision Making Entity, an identified single, or simultaneous combination of, most cost performance advantageous secondary spectrum opportunity, the identified secondary spectrum opportunity comprising spectrum selected from among dedicated licensed spectrum and unlicensed spectrum, the dedicated licensed spectrum comprising cellular mobile phone bands and the unlicensed spectrum comprising industrial, scientific and medical (ISM) radio bands and coordinated and uncoordinated white space and ultra-wide band frequencies, the most cost performance advantageous secondary spectrum opportunity determined by a total cost function applied to dedicated licensed spectrum and unlicensed spectrum, the total cost function calculated by use of a first weighting factor depending on an amount of spectrum available for new users and a second weighting factor for needs of applications to be conveyed on a corresponding band and using a corresponding access technology; and
   accepting the identified secondary spectrum opportunity detailed in a Spectrum Database containing information about current and/or future availability of Spectrum.

9. The method of claim 8, further comprising requesting, from a Coordinated Spectrum Access Controller, an initial availability indication of any available spectrum.

10. The method of claim 8, wherein, the Spectrum Decision Making Entity negotiates a most advantageous secondary spectrum opportunity with a Spectrum Broker communicatively coupled to the Spectrum Decision Making Entity.

11. The method of claim 8, wherein the most advantageous secondary spectrum opportunity is identified by a cost-function optimization.

12. The method of claim 8, wherein the total cost function is calculated by applying the first and second weighting factors to ranked Key Performance Indicators (KPIs) comprising Cost, Guaranteed Quality of Service (QoS), Efficiency, and/e Amount of Spectrum available.

13. A User Equipment (UE) comprising a transceiver and a processor in communication with the transceiver and configured to:
  communicate spectrum needs of the UE to a Spectrum Decision Making Entity;
  receive, from the Spectrum Decision Making Entity, an identified single, or simultaneous combination of, most cost performance advantageous secondary spectrum opportunity, the identified secondary spectrum opportunity comprising spectrum selected from among dedicated licensed spectrum and unlicensed spectrum, the dedicated licensed spectrum comprising cellular mobile phone bands and the unlicensed spectrum comprising industrial, scientific and medical (ISM) radio bands and coordinated and uncoordinated white space and ultra-wide band frequencies, the most cost performance advantageous secondary spectrum opportunity determined by a total cost function applied to dedicated licensed spectrum and unlicensed spectrum, the total cost function calculated by use of a first weighting factor depending on an amount of spectrum available for new users and a second weighting factor for needs of applications to be conveyed on a corresponding band and using a corresponding access technology; and
  accept the identified secondary spectrum opportunity from a Spectrum Broker communicatively coupled to the Spectrum Decision Making Entity.

14. The UE of claim 13, wherein the transceiver is further configured to request, from a Coordinated Spectrum Access Controller, an initial availability indication of any available spectrum.

15. The UE of claim 13, wherein the transceiver is communicatively coupled, directly or through a Coordinated Spectrum Access Controller, to a Spectrum Database comprising information about current and/or future availability of spectrum, the Spectrum Database comprising Radio Environment Map information, which provides an overall picture on radio parameters including quality of service (QoS) and Quality of Experience (QoE) for a given access technology, a given frequency band, a given geographic area and a given time period.

16. The UE of claim 13, wherein the received most advantageous secondary spectrum opportunity is identified by a cost-function optimization.

17. The UE of claim 13, wherein the total cost function is calculated by applying the first and second weighting factors to ranked Key Performance Indicators (KPIs) comprising Cost, Guaranteed Quality of Service (QoS), Efficiency, and/le Amount of Spectrum available.

18. A non-transitory computer readable storage device including instructions stored thereon, the instructions, which when executed by a machine, cause the machine to perform operations comprising:
  communicating spectrum needs of a plurality of user equipment to a Spectrum Decision Making Entity;
  receiving, from the Spectrum Decision Making Entity, an identified single, or simultaneous combination of, most cost performance advantageous secondary spectrum opportunity, the identified secondary spectrum opportunity comprising spectrum selected from among dedicated licensed spectrum and unlicensed spectrum, the dedicated licensed spectrum comprising cellular mobile phone bands and the unlicensed spectrum comprising industrial, scientific and medical (ISM) radio bands and coordinated and uncoordinated white space and ultra-wide band frequencies, the most cost performance advantageous secondary spectrum opportunity determined by a total cost function applied to dedicated licensed spectrum and unlicensed spectrum, the total cost function calculated by use of a first weighting factor depending on an amount of spectrum available for new users and a second weighting factor for needs of applications to be conveyed on a corresponding band and using a corresponding access technology; and
  accepting the identified secondary spectrum opportunity from a Spectrum Broker communicatively coupled to the Spectrum Decision Making Entity.

19. The storage device of claim 18, wherein the storage device further comprises instructions stored thereon, which when executed by the machine, cause the machine to perform operations comprising requesting, from a Coordinated Spectrum Access Controller, an initial availability indication of any available spectrum.

20. The storage device of claim 18, wherein the instructions for receiving, from the Spectrum Decision Making Entity, an identified most advantageous secondary spectrum opportunity include instructions for receiving a spectrum opportunity based on a Spectrum Database comprising information about current and/or future availability of spectrum, the Spectrum Database comprising Radio Environment Map information, which provides an overall picture on radio parameters including quality of service (QoS) and Quality of Experience (QoE) for a given access technology, a given frequency band, a given geographic area and a given time period.

21. The storage device of claim 18, wherein the instructions for receiving, from the Spectrum Decision Making Entity, an identified most advantageous secondary spectrum opportunity include instructions for receiving a spectrum opportunity identified by a cost-function optimization.

22. The storage device of claim 18, wherein the instructions for receiving, from the Spectrum Decision Making Entity, an identified most advantageous secondary spectrum opportunity include instructions for receiving a spectrum opportunity identified according to the total cost function, which is calculated by applying the first and second weighting factors to ranked Key Performance Indicators (KPIs) comprising Cost, Guaranteed Quality of Service (QoS), Efficiency, and Amount of Spectrum available.

* * * * *